United States Patent [19]
Wallis

[11] Patent Number: 5,386,975
[45] Date of Patent: * Feb. 7, 1995

[54] GAS DIE CYLINDERS

[76] Inventor: Bernard J. Wallis, 2215 Dacosta, Dearborn, Mich. 48128

[*] Notice: The portion of the term of this patent subsequent to Mar. 30, 2010 has been disclaimed.

[21] Appl. No.: 164,428

[22] Filed: Dec. 8, 1993

Related U.S. Application Data

[63] Continuation of Ser. No. 715,594, Jun. 14, 1991, abandoned, which is a continuation-in-part of Ser. No. 627,699, Dec. 14, 1990, Pat. No. 5,197,718.

[51] Int. Cl.⁶ .............................. F16F 9/02; F16F 9/34
[52] U.S. Cl. .............................. 267/119; 267/64.28; 267/130
[58] Field of Search .......................... 267/64.11–64.28, 267/119, 130, 75, 121, 124, 118, 34, 124–129; 137/68.1, 71, 70; 92/134, 117, 128, 165 R, 168, 21 MR, 15, 17; 188/371, 376, 321.11, 322.21; 72/453.13; 91/417 R, 422

[56] References Cited

U.S. PATENT DOCUMENTS

| | | | |
|---|---|---|---|
| 3,101,194 | 8/1963 | Hennells, Sr. | 267/119 |
| 3,428,303 | 2/1969 | Lynch . | |
| 4,528,838 | 7/1985 | Wallis . | |
| 4,529,181 | 7/1985 | Wallis . | |
| 4,572,489 | 2/1986 | Wallis . | |
| 4,583,722 | 4/1986 | Wallis . | |
| 4,585,215 | 4/1986 | Kramer . | |
| 4,628,796 | 12/1986 | Wallis . | |
| 4,741,518 | 5/1988 | Wallis . | |
| 4,742,997 | 5/1988 | Wallis . | |
| 4,765,227 | 8/1988 | Balazs et al. . | |
| 4,813,655 | 3/1989 | Hennells | 267/119 X |
| 4,838,527 | 6/1989 | Holley | 267/130 |
| 4,844,429 | 7/1989 | Ecktman | 267/119 X |
| 5,088,698 | 2/1992 | Wallis | 267/119 |
| 5,172,892 | 12/1992 | Wallis | 267/119 |
| 5,197,718 | 3/1993 | Wallis | 267/119 |

Primary Examiner—Douglas C. Butler
Attorney, Agent, or Firm—Barnes, Kisselle, Raisch, Choate, Whittemore & Hulbert

[57] ABSTRACT

A gas cylinder for use in die systems for forming lightweight parts. In one form, the cylinder forms a self contained gas spring which is interchangeable with a coil spring that is constructed such that it is not adversely affected by the deleterious effects of oil and other contaminants. The gas cylinder comprises a one-piece cylindrical upper body having a base wall and a peripheral wall and a hollow rod extending upwardly into the cylindrical body such that the upper body completely encircles and encloses the upper end of the rod. The rod has a base having an outer diameter greater than the diameter of the rod. The peripheral wall of the cylinder and the outer diameter of the base have substantially the same diameter such that the cylinder can be positioned in a recess of a press or die in place of a coil spring. The cylindrical body and rod include interengaging portions limiting axially outwardly movement of the cylinder relative to the rod. In one form, the cylinder further includes a charging valve in the base of the rod through which gas may be introduced for charging the space between the cylinder and the rod and a pressure relief rupture disk in the base wall of the cylindrical body. In another form, the opening in the hollow rod is exposed and the base is formed with an axial projection that is threaded for engagement into a manifold or valve block used in the die system.

1 Claim, 13 Drawing Sheets

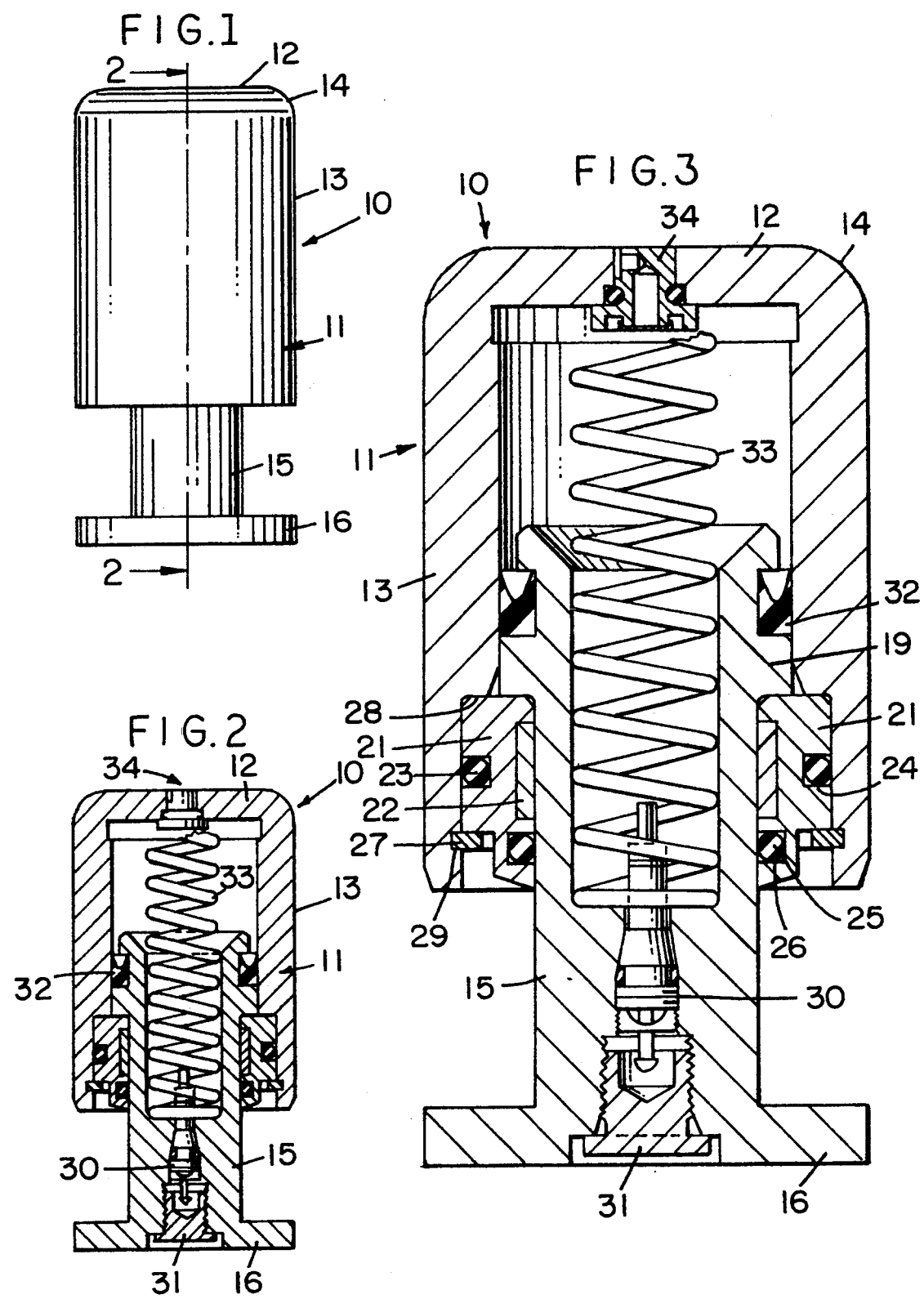

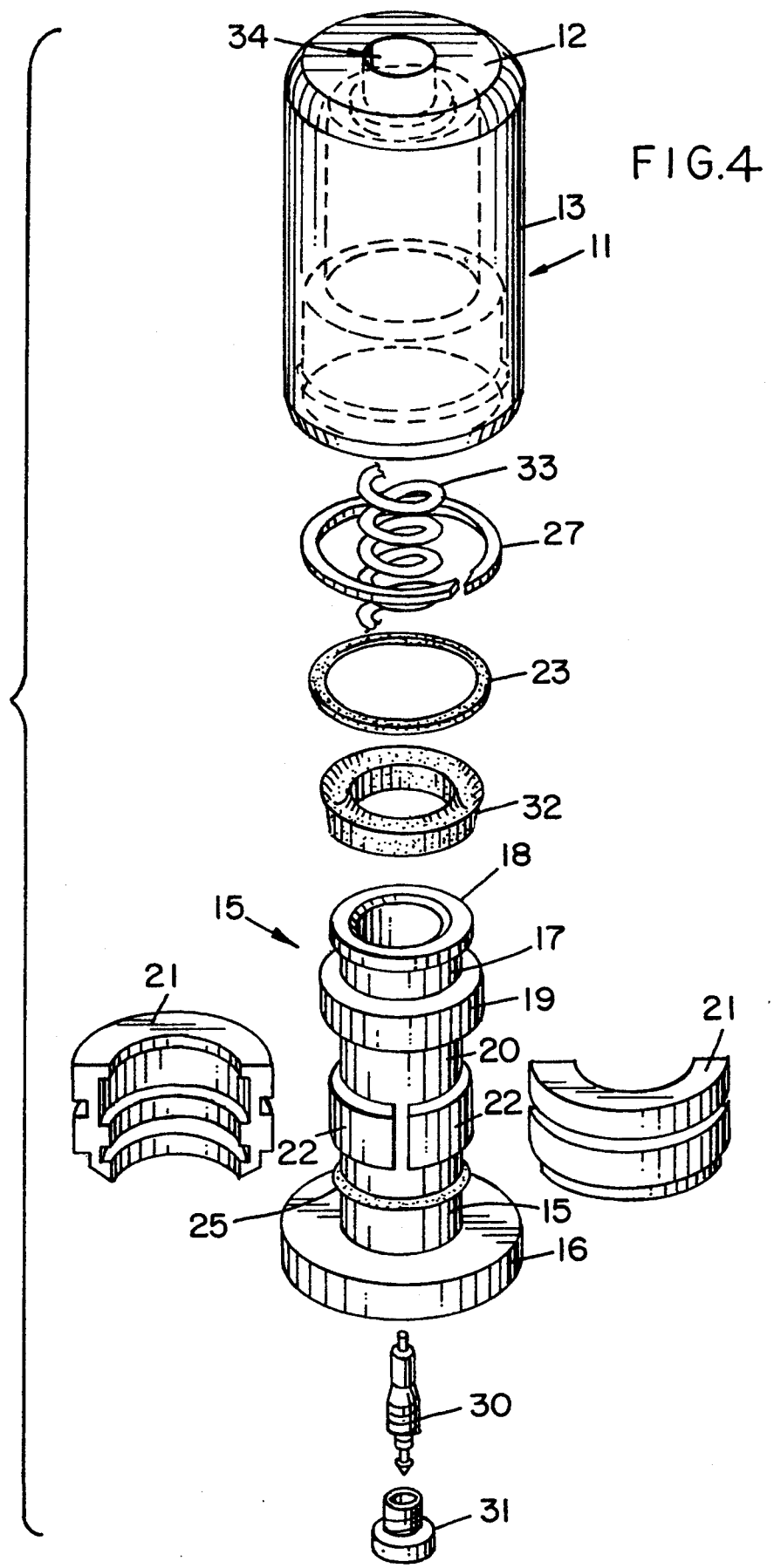

GAS DIE CYLINDERS

This is a continuation of Ser. No. 07/715,594 filed on Jun. 14, 1991, now abandoned, which is a continuation-in-part of application Ser. No. 07/627,699 filed Dec. 14, 1990, now U.S. Pat. No. 5,197,718.

BACKGROUND AND SUMMARY OF THE INVENTION

In presses and dies it has been common to utilize metal coil springs that fit in cylindrical pockets in a die in order to absorb the force of various operations such as metal stamping operations. It has also been common to design tooling such that they incorporate gas cylinders which are either associated with a manifold or self contained. In a manifold type, a plurality of gas cylinders are mounted in a manifold or connected to a line and gas from the manifold or line is maintained on each gas cylinder, as shown, for example, in U.S. Pat. Nos. 4,528,838, 4,529,181, 4,572,489, 4,583,722 4,628,796 and 4,742,997.

Such cylinders are complex and expensive and therefore have been found to be less used in lightweight part manufacture.

When coil springs are utilized in tooling, a large number of such coil springs are required. Furthermore, they tend to fatigue and break in which case the fragments can damage the tooling. Casings have been used about each coil spring to minimize such damage. It has hereto been proposed that a self contained gas spring be interchangeable with a metal coil spring as shown in U.S. Pat. No. 4,741,518.

As set forth in U.S. Pat. No. 4,741,518, a self contained gas spring interchangeable with a coil spring comprises a cylindrical body having a constant diameter external cylindrical surface, the cylindrical body having open ends and a piston within said cylindrical body and having one end projecting through one of the openings of the cylindrical body. The piston and the cylindrical body have interengaging flanges that limit the outward movement of the piston relative to the cylindrical body. A plug is positioned in the other end of the cylindrical body to close the opening of the cylindrical body. A charging valve is positioned in the plug for charging the interior of the gas spring. The piston has a hollow inner end with an inner surface tapering outwardly and axially toward the plug. The plug has a generally complementary surface such that the piston can move downwardly about a portion of the plug thereby substantially reducing the height of the gas spring. Such a gas spring is effective for the intended purpose. However, it is likely to be subjected to contamination by oil or other external contaminants passing downwardly along the piston.

Among the objectives of the present invention are to provide a small gas cylinder which is relatively low in cost and be used either in die systems that are provided in connection with a manifold or valve blocks for supplying gas to a plurality of cylinders or in the form of a self-contained gas cylinder or spring; a small gas spring which is interchangeable with a coil spring; which can be readily substituted for a coil spring without any change in the tooling; which is compact and effective for the intended purpose; which obviates the deleterious effects of oil or other contaminants from the exterior of the press or die; which can be readily assembled; which will be retained in position in case of dissipation or loss of gas pressure without risk of damage to the tooling; which does not require any separate casing as is used in coil springs; and which can be provided in various sizes to produce the desired forces so that the gas spring can replace a plurality of coil springs.

In accordance with the invention, the gas cylinder for use in die systems for forming lightweight parts. In one form, the cylinder forms a self contained gas spring which is interchangeable with a coil spring that is constructed such that it is not adversely affected by the deleterious effects of oil and other contaminants. The gas cylinder comprises a one-piece cylindrical upper body having a base wall and a peripheral wall and a hollow rod extending upwardly into the cylindrical body such that the upper body completely encircles and encloses the upper end of the rod. The rod has a base having an outer diameter greater than the diameter of the rod. The peripheral wall of the cylinder and the outer diameter of the base have substantially the same diameter such that the cylinder can be positioned in a recess of a press or die in place of a coil spring. The cylindrical body and rod include interengaging portions limiting axially outwardly movement of the cylinder relative to the rod. In one form, the cylinder further includes a charging valve in the base of the rod through which gas may be introduced for charging the space between the cylinder and the rod and a pressure relief rupture disk in the base wall of the cylindrical body. In another form, a threaded axial projection is provided on the rod. In another form, the opening in the hollow rod is exposed and the base is formed with an axial projection that is threaded for engagement into a manifold or valve block used in the die system.

DESCRIPTION OF THE DRAWINGS

FIG. 1 is a elevational view in actual size of a gas spring embodying the invention.

FIG. 2 is a vertical sectional view of the gas spring shown in FIG. 1 taken along the line 2—2 in FIG. 1.

FIG. 3 is a sectional view similar to FIG. 2 on an greatly enlarged scale.

Fig 4 is a exploded view of a gas spring embodying the invention.

DESCRIPTION

Figure 5:
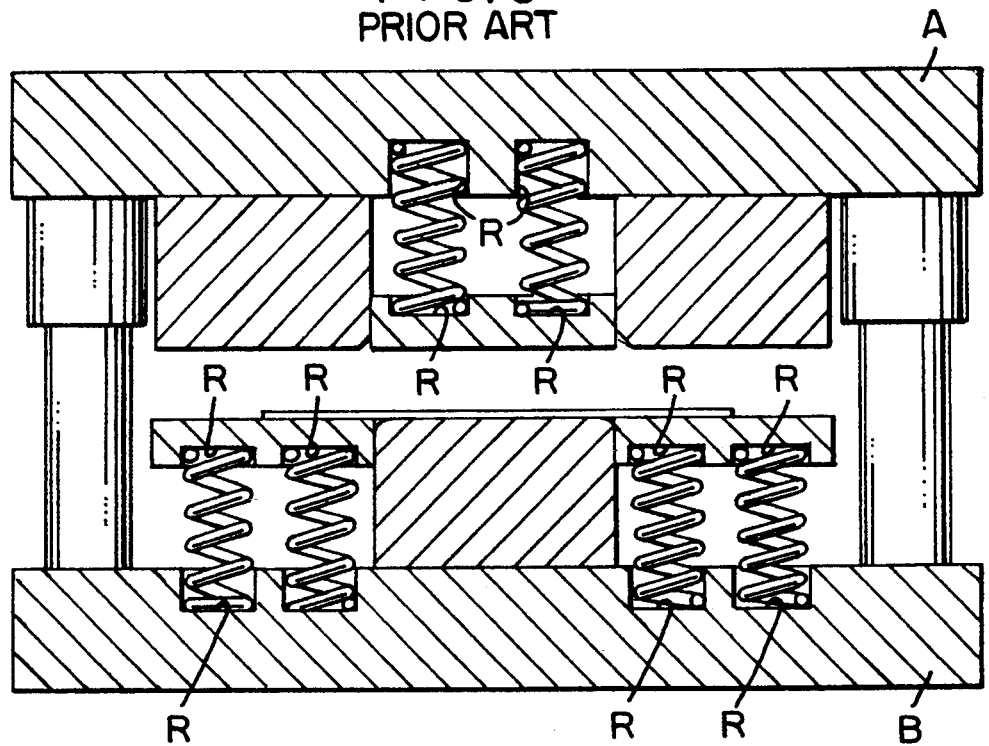
FIG. 5 is a vertical sectional view of a portion of a stamping press utilizing coil springs in accordance with the prior art.
Figure 6:
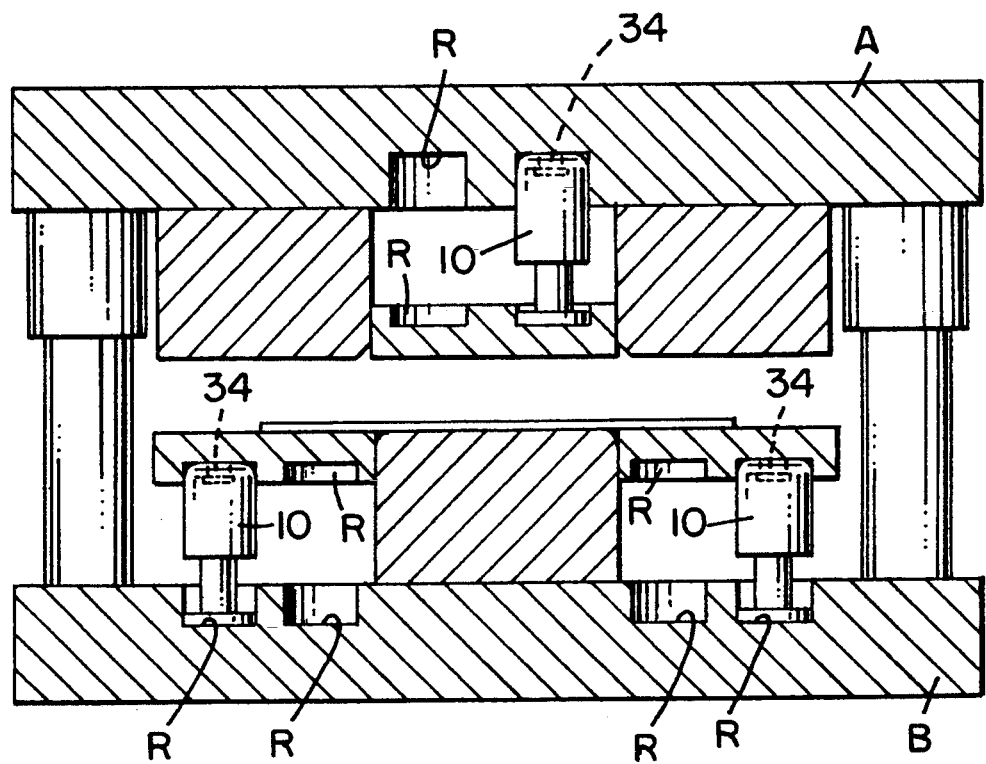
FIG. 6 is a sectional view of a portion of a press showing the use of gas springs embodying the invention utilized in place of the coil springs.

Referring to FIGS. 5 and 6, the gas springs 10 embodying the invention are adapted to be interchangeable with coil springs 11 that fit into pockets in the portion of the die R or the like of a press such as it is used in metal stamping.

Referring to FIG. 1, a gas spring 10 embodying the invention comprises a cylinder 11 which is preferably made of metal in one piece and has a base wall 12 and a peripheral wall 13 connected by an outer rounded portion 14. A rod 15 extends upwardly into the cylindrical body 11 such that the upper body completely encircles and encloses the upper end of the rod and has a base 16 having an exterior diameter substantially equal to the exterior diameter of the cylindrical wall 13 of the cylinder such that one or more of the gas springs 10 can be positioned in the recesses of a tooling as shown in FIG. 6 in place of the coil springs (FIG. 5). The diameter of the base 16 is substantially the same as the diameter of the coil spring which it is to replace such that it substantially files the recess R.

Referring to FIGS. 2, 3, and 4, the rod 15 includes a groove 17 at its upper end formed by a radial flange 18 at the free end and a spaced integral annular portion 19. The remainder of the rod 15 below the flange 19 has a constant diameter as at 20 extending to the base 16. An annular lip seal 32 is positioned in the groove 17. The annular flange 19 cooperates with a stop 21 on the cylinder to limit the axially outward movement of the cylinder 11 under the action of pressure when the gas spring is pressurized. The stop 21 comprises a separate member and is preferably in the form of two split portions 21 (FIG. 4) that surround the rod 15 and enclose split wear pads 22. An O-ring 23 is provided in a recess 24 in the split portions 21 of the stop 21. An O-ring 25 is provided in a recess 26 on the interior of the split portions of stop 21. A split spring retainer 27 in a recess 29 in wall 13 maintains the stop 21 in position within the enlarged lower portion 28 on the inner surface of the wall 13.

Figure 7:
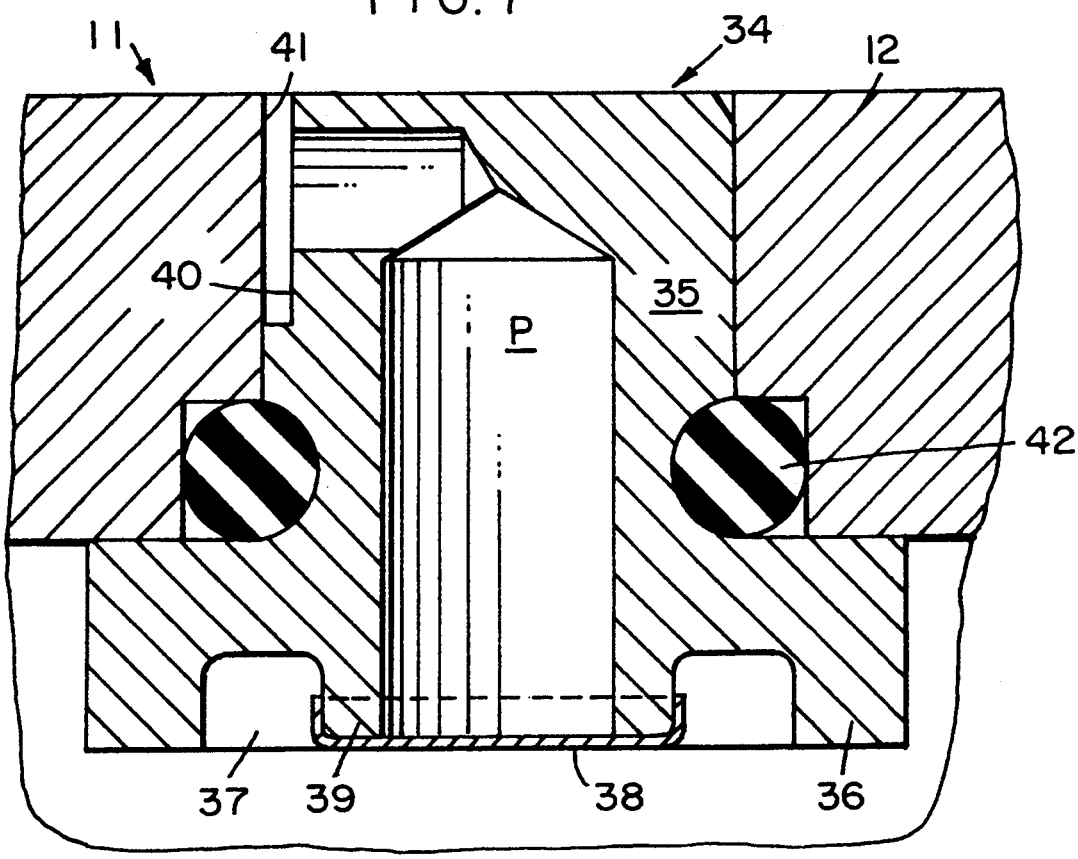
FIG. 7 is a sectional view on a greatly enlarged scale of the portion of the gas spring having a rupture disk assembly mounted therein.
Figure 8:
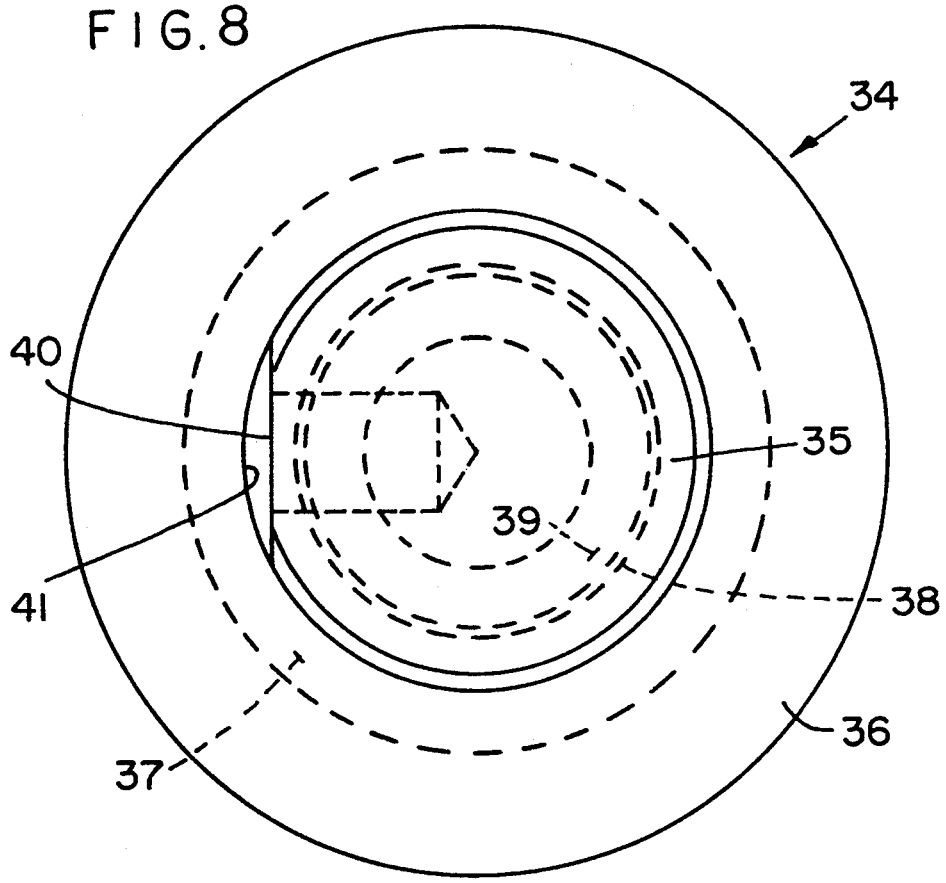
FIG. 8 is a plan view of the portion of the gas spring shown in FIG. 7.

A charging valve 30 is threaded into the lower end of the rod and is accessible after removal of the threaded plug 31 in the base of the rod 15. A spring 33 is interposed between the under surface of the base wall 12 and the base of an axial recess in the rod 15 to provide a yielding force urging the cylinder body 11 outwardly when there is no gas charges. A pressure relief valve in the form of a rupture disk assembly 34 is provided by press fit in the base wall 12 of the cylindrical body and functions to relieve excessive pressure which may occur. As shown in FIGS. 7 and 8, the rupture disk assembly comprises a body 35 that is press fitted in an opening from the interior of the cylindrical body 11. The body 35 includes a flange 36 that engages the inner surface of the base wall 12. The flange 36 includes an annular groove 37 which defines a tubular extension 39 over which a metal rupture disk 39 is positioned. The disk 38 includes a peripheral skirt extending about the outer surface of the tubular extension 39 and soldered thereto. The groove 37 facilitates mounting of the disk and the soldering thereof as the converted body 35 is inserted or moved. An O-ring 42 in a recess in the body 35 facilitates a gas tight seal. Upon rupture of the disk 38, gas is vented through a passage P. The body 35 has a passage defined by opening 41 in the base wall and a flattened portion 40 on the upper end of the body.

In order to assemble the cylinder, the seal 32 is first placed in the groove 17 on the rod 15. The lower wear pads 22 are assembled in the split portions of the stop 21 and then the O-ring 23 is provided over the split portions of the stop 21. The rod 15 is inserted in the cylinder body where the split portions in assembled position thereon and the split retainer 27 is finally provided in the groove 29 to retain the spring in a assembled position.

In use, the gas springs are pressurized and positioned in place of coil spring in some of the recesses R of the press. Inasmuch as the gas spring provides substantially more force than a typical coil spring, one gas spring can be utilized in place of a plurality of coil springs.

Figure 9:
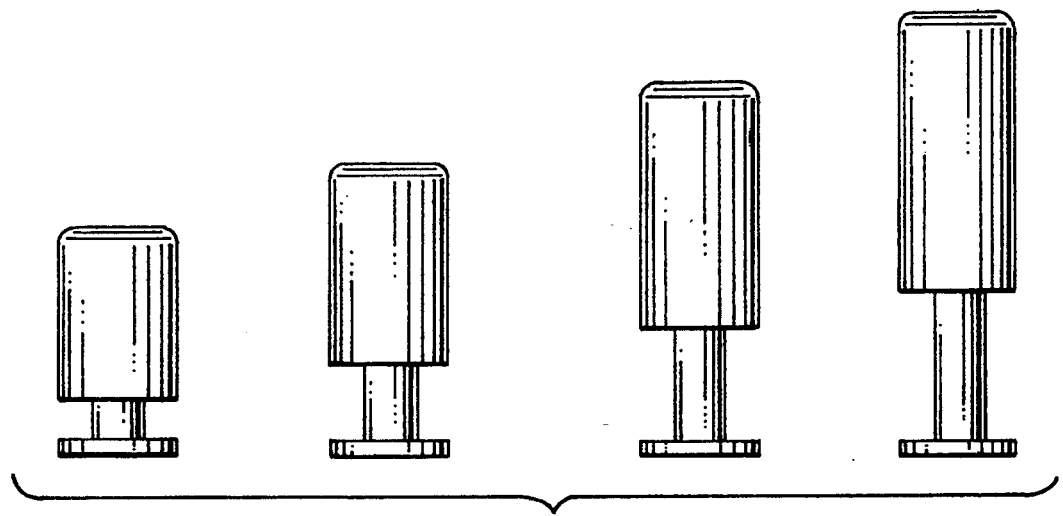
FIGS. 9 and 10 are views showing a plurality of sizes of gas springs embodying the invention.
Figure 10:
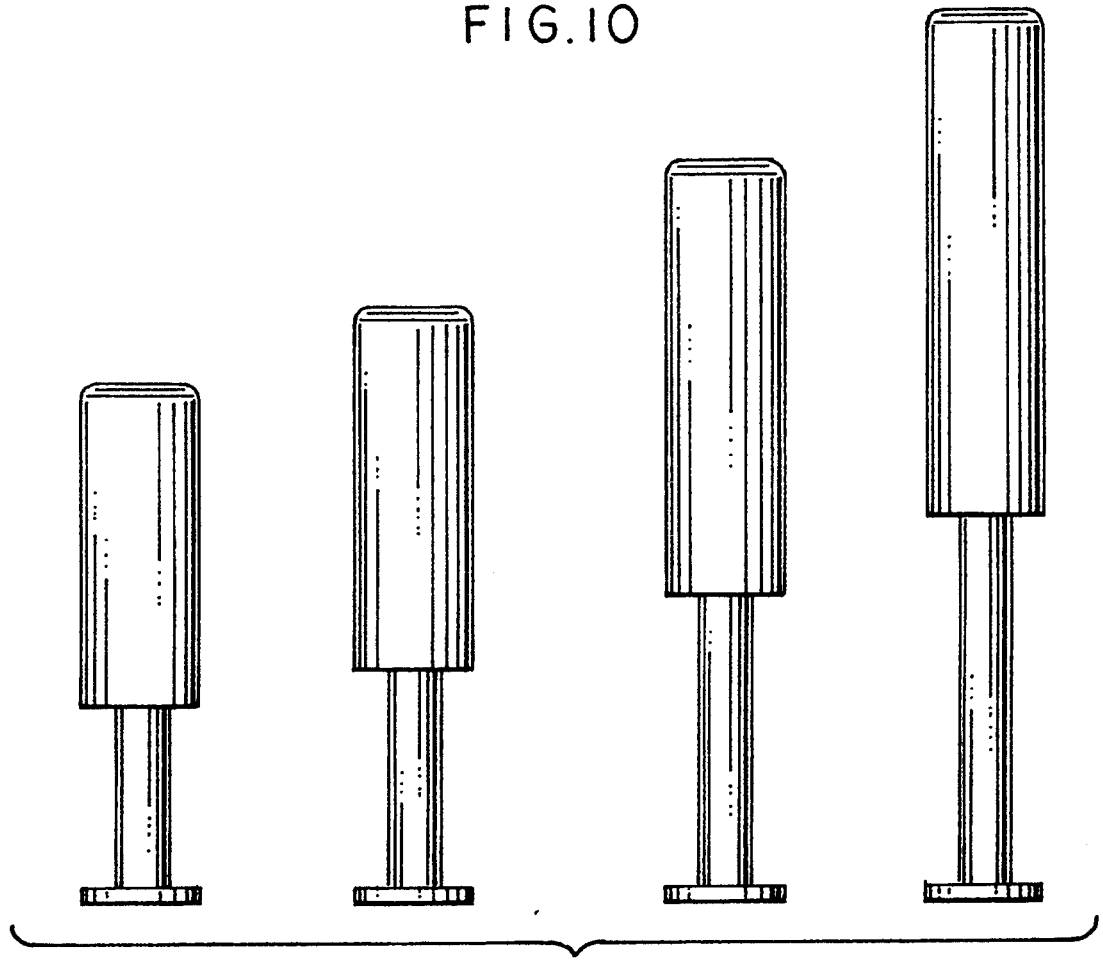

Referring to FIGS. 9 and 10, it can be readily seen that the gas springs can be provided in various sizes. Inasmuch as the outer diameter of the cylinder is substantially equal to the outer diameter of the base, the gas spring occupies the same space and when placed in the lower portion of the press or die, contaminates will not interfere with the functioning of the gas spring.

Since the cylindrical body 11 completely encloses the upper end of the rod, the gas spring is not adversely affected by oil or other contaminants. The provision of the base 16 insures that the gas spring is retained in position in the enlarged recess which is normally provided for a coil spring. The provision of the spring 33 insures that the gas spring remains in position even if the gas is dissipated by leakage or by rupturing of the disk due to excessive pressure.

The gas spring 10a shown in FIGS. 11–13 and 18 is substantially identical to that shown in FIGS. 1–4 except that fastening means in the form of openings 50 are provided on base 16a for attachment of the cylinder to a flat surface of the die system.

Figure 14:
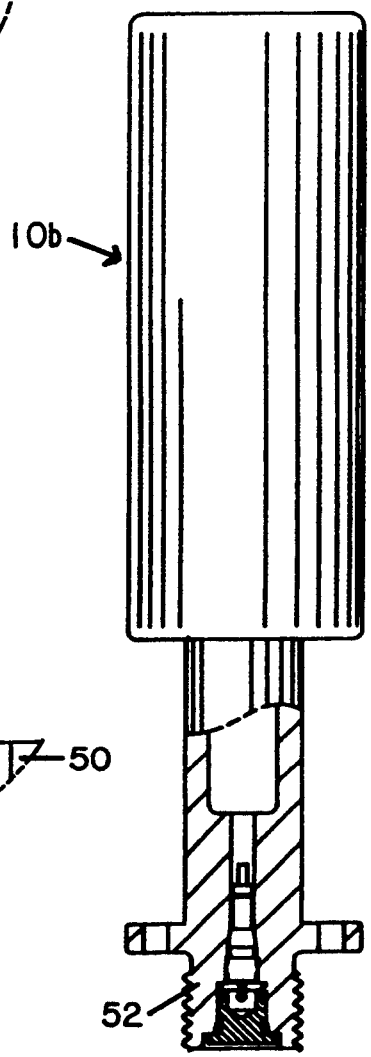
FIG. 14 is a part sectional view of a further modified form of gas cylinder.
Figure 19:
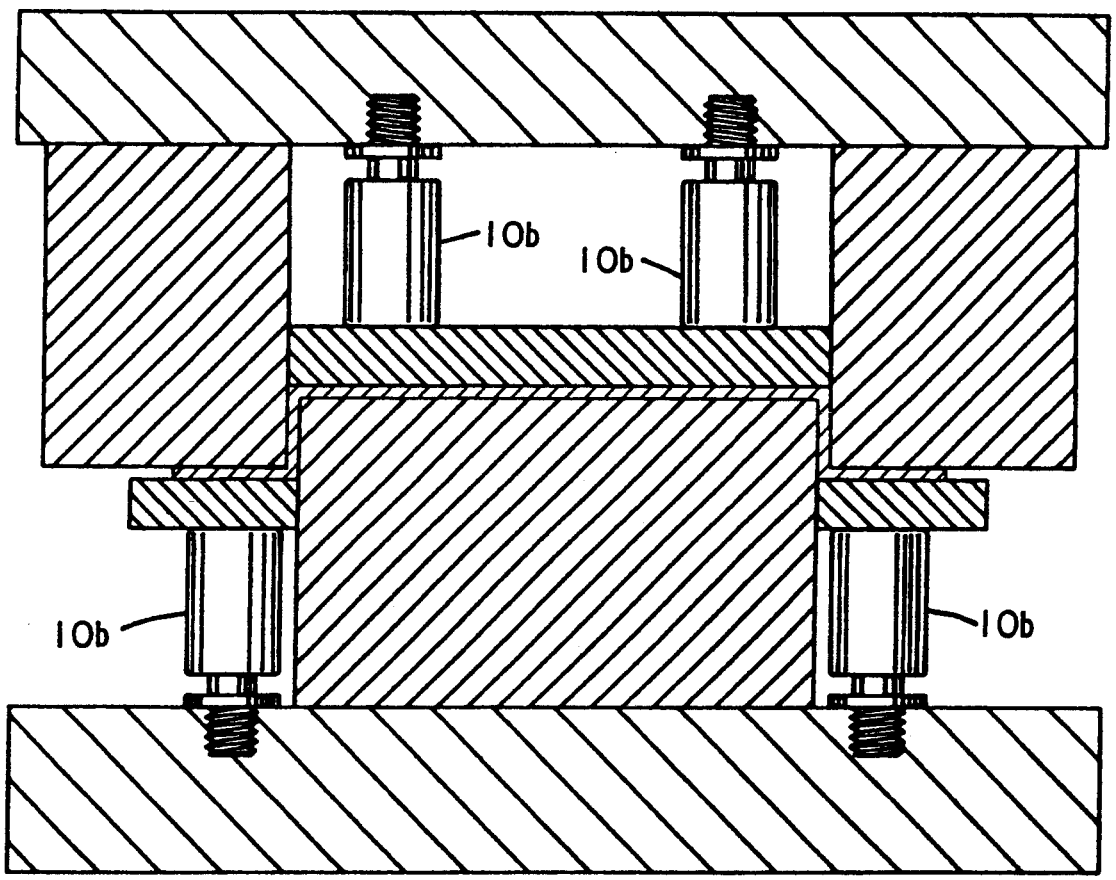
FIG. 19 is a partly diagrammatic view of a die system showing the use of cylinders such as shown in FIG. 14.

In the form shown in FIG. 14, the cylinder 10b further includes an integral axial extension 52 that is threaded such that the die cylinder can be placed in a threaded opening in the die system as shown in FIG. 19, for example. The base engages a complementary surface in the die system.

Figure 11:
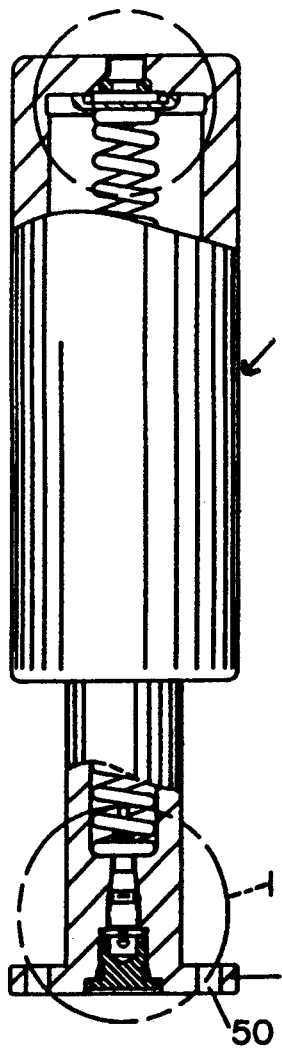
FIG. 11 is a part sectional elevational view of a modified form of gas cylinder embodying the invention.
Figure 13:
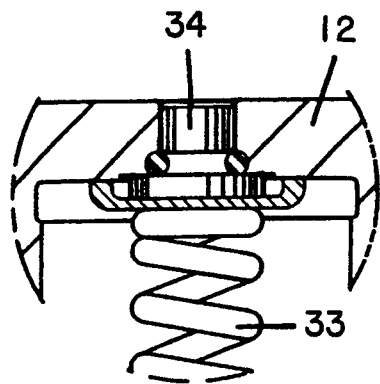
FIG. 13 is a fragmentary sectional view on an enlarged scale of the upper portion of the cylinder shown in FIG. 11 taken at the line 12a in FIG. 11.
Figure 12:
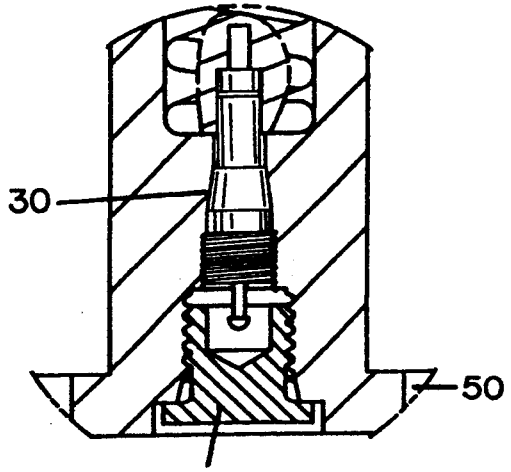
FIG. 12 is a fragmentary sectional view on an enlarged scale of the lower portion of the cylinder shown in FIG. 11.
Figures 15, 16, 17:
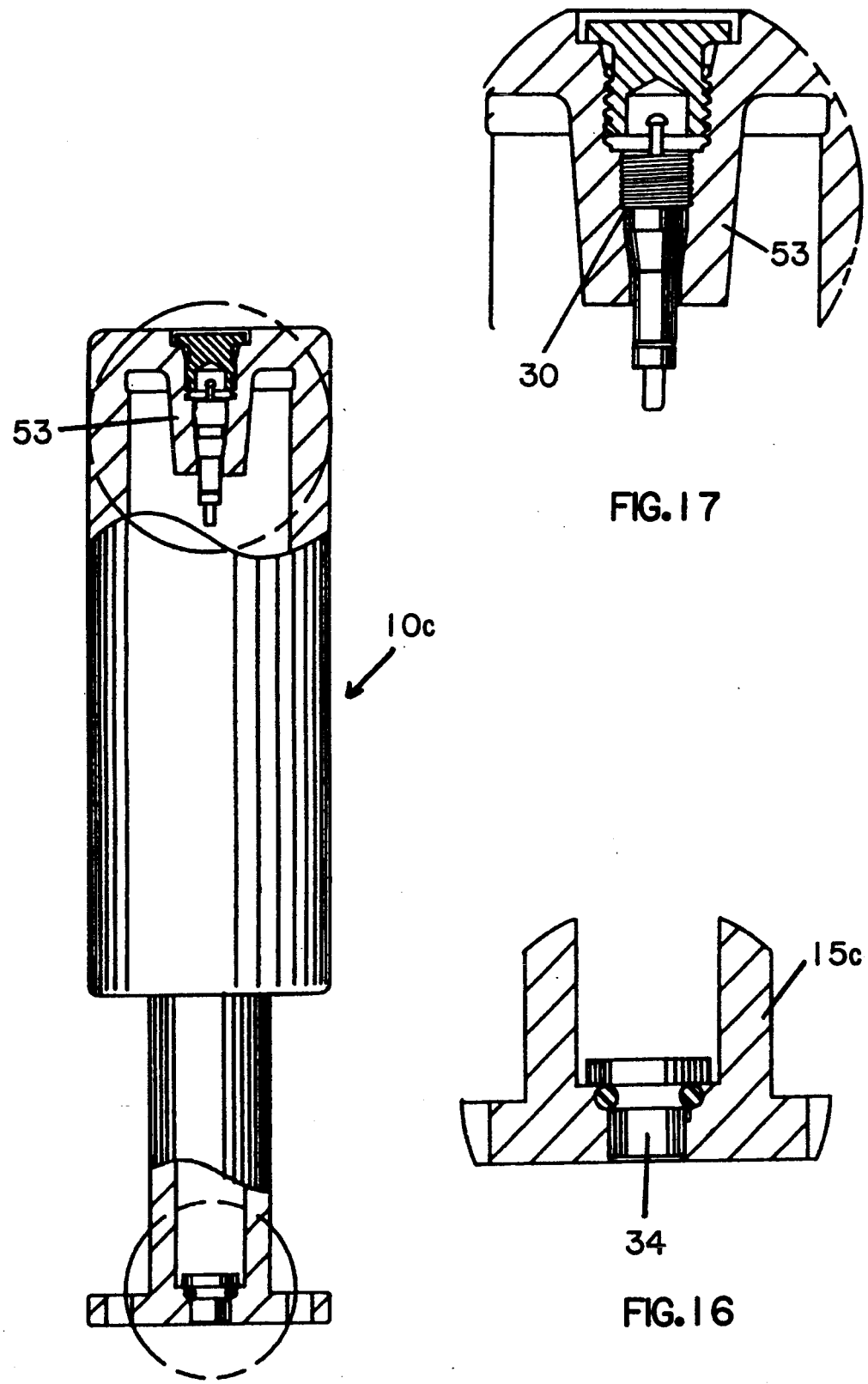
FIG. 15 is a part sectional view of a further modified form of gas cylinder.
FIG. 16 is a sectional view on an enlarged scale of the lower portion of the cylinder shown in FIG. 15.
FIG. 17 is a fragmentary sectional view on an enlarged scale of the upper portion of the cylinder shown in FIG. 15.
Figure 18:
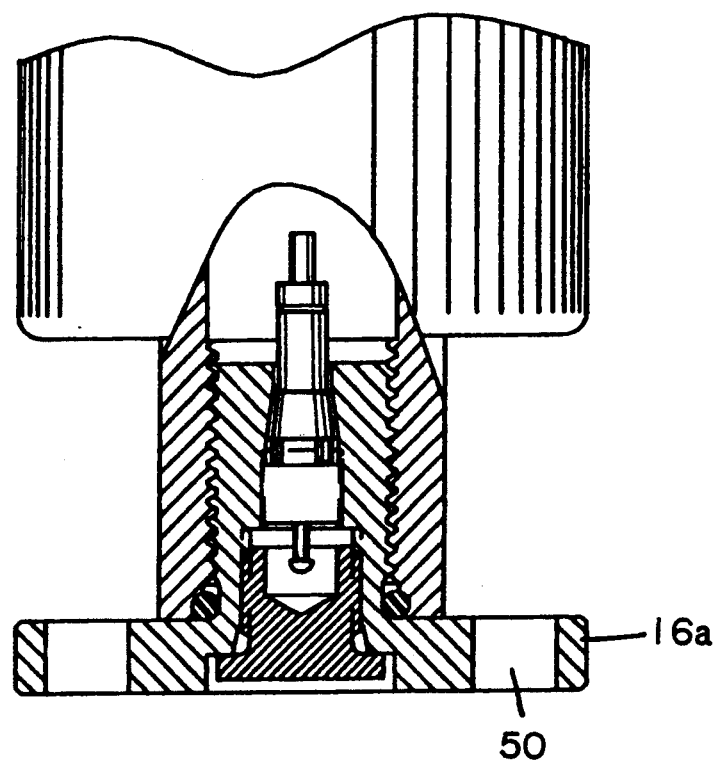
FIG. 18 is a part sectional view of a further form of cylinder.

The die cylinder 10c shown in FIGS. 15–17 is substantially identical to that shown in FIGS. 11–13 except that the charging valve 30 is threaded into an integral inwardly extending axial projection 53 on the top wall 12c and the pressure relief disk assembly 34 is placed in the base of the rod 15c. In addition, in this form, the spring 33 has been omitted.

Figure 21:
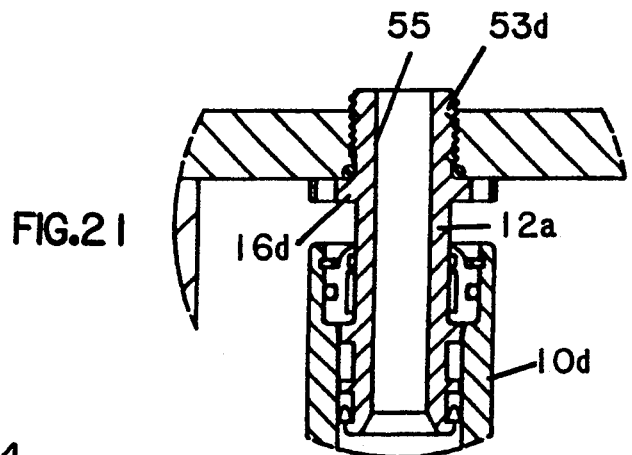
FIG. 21 is a sectional view of a portion of the system shown in FIG. 20 on an enlarged scale.
Figure 20:
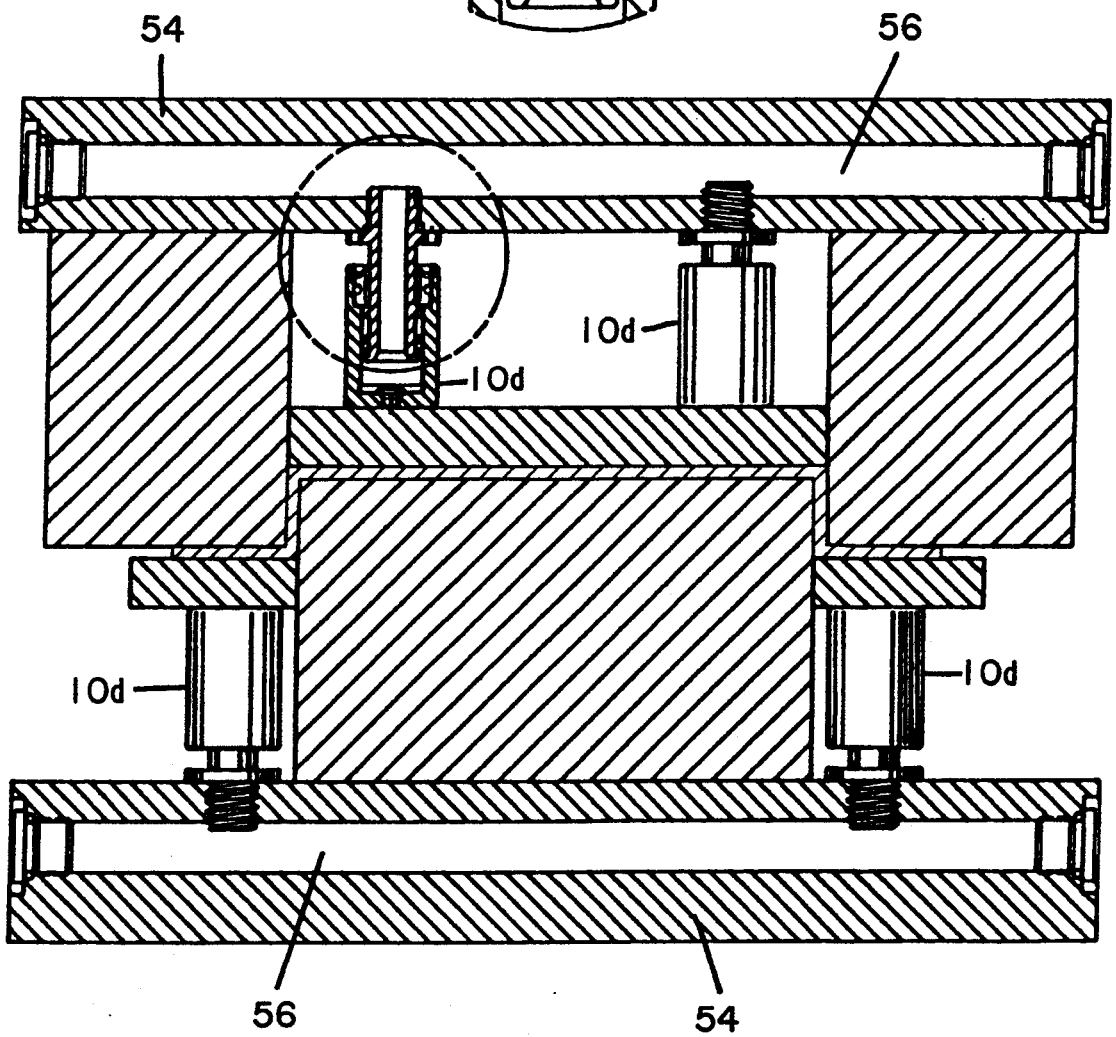
FIG. 20 is a part sectional view of another die system utilizing a modified cylinder.
Figure 22:
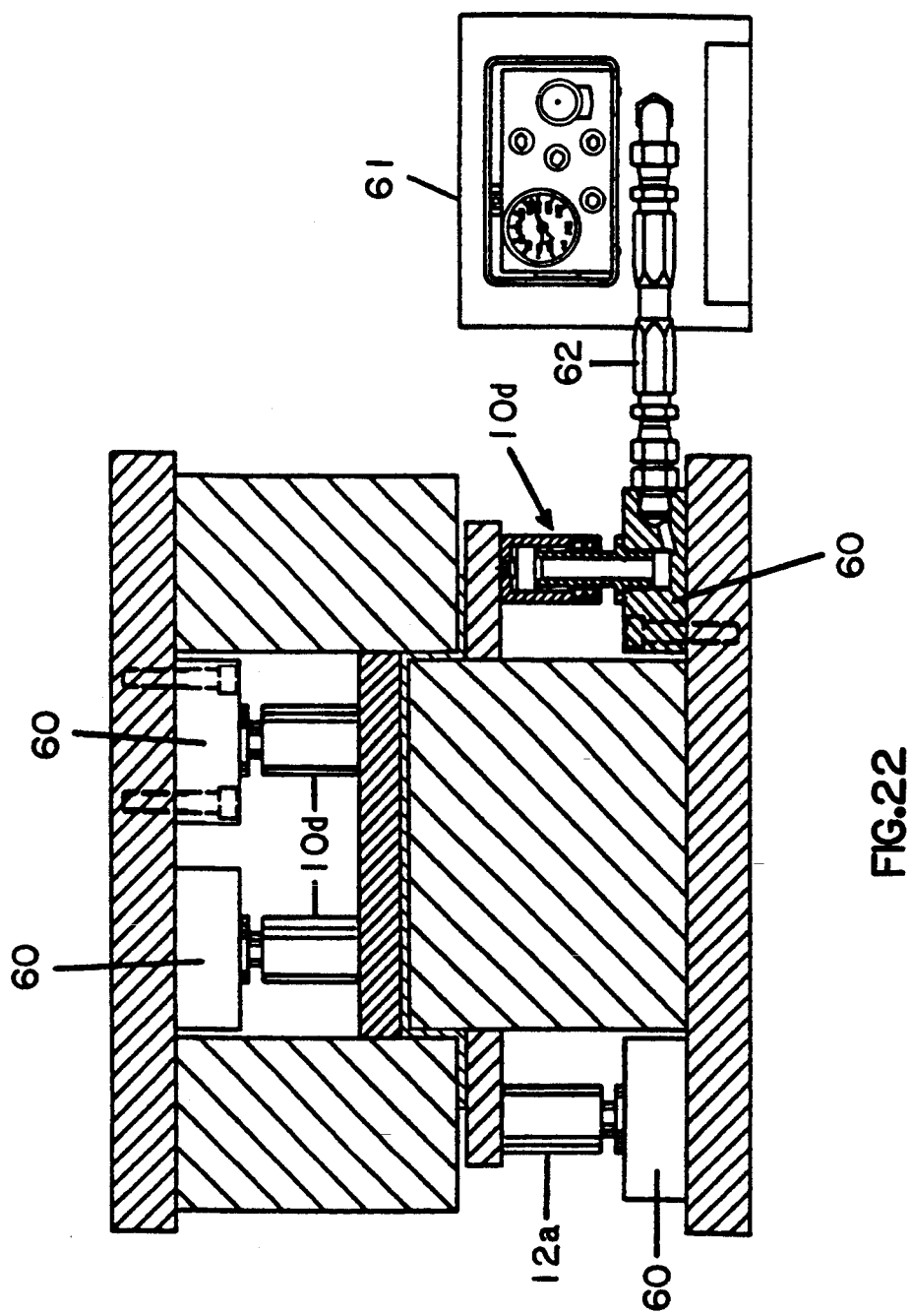
FIG. 22 is a still further die system utilizing the cylinder of FIG. 18.
Figure 25:
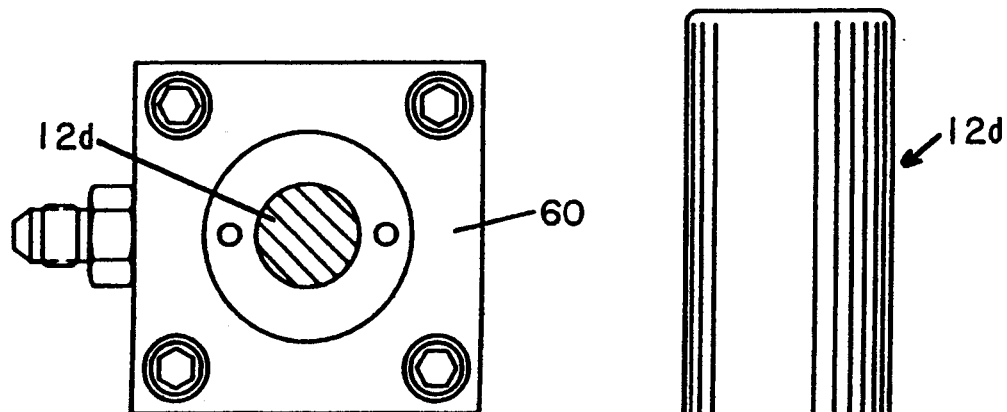
FIG. 25 is a sectional view taken along the line 25—25 in FIG. 23.
Figure 23:
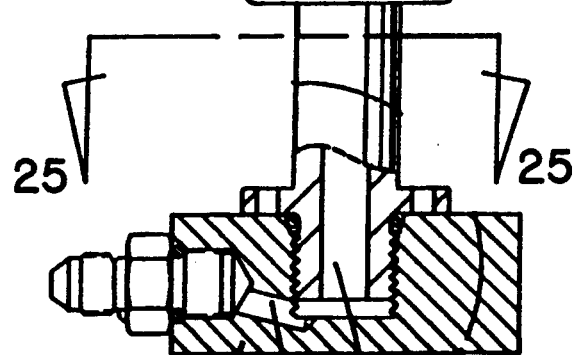
FIG. 23 is a sectional view on an enlarged scale of a portion of the system shown in FIG. 22.
Figure 24:
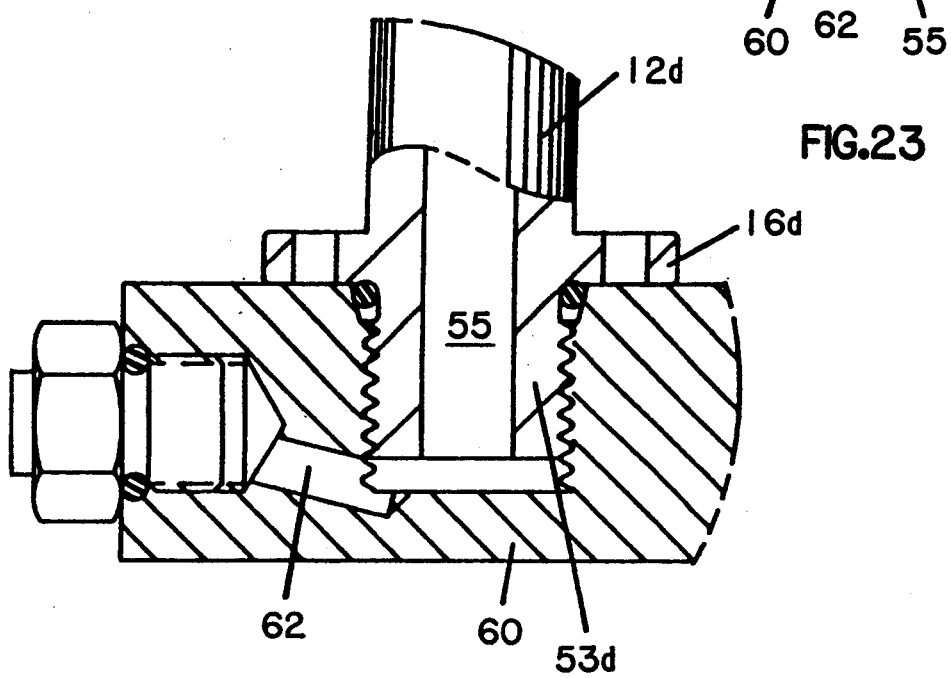
FIG. 24 is a sectional view on an enlarged scale similar to FIG. 23.

Substantially the same gas cylinder can be utilized in a system with a manifold 54, as shown in FIG. 20. As shown in FIG. 21, the rod 15d has a base 16d and a threaded extension 53d on the base 16d. The charging valve 30 is omitted and an opening 55 extends entirely through the rod 15d to provide communication with the gaseous fluid in the manifold chamber 56.

Similarly, as shown in FIGS. 22–25, the cylinders 10d can be threaded into valve blocks 60 that have complementary surfaces to the base. The valve blocks 60 are supplied with gas from a pressure regulators 61 through passages 62 that communicate with the open ends of the rods 12d.

Figure 26:
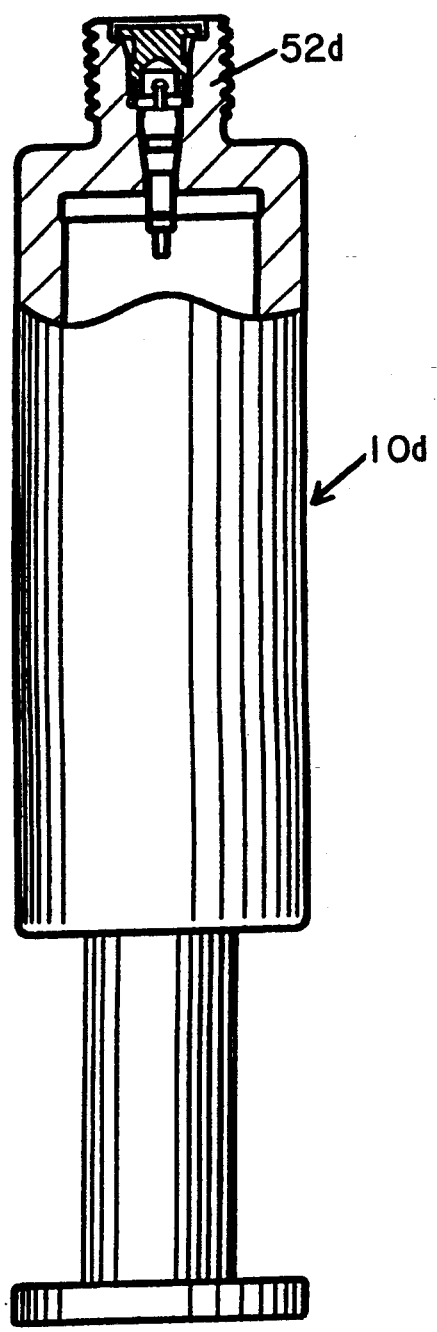
FIG. 26 is a part sectional view of a modified form of self-contained gas cylinder.

In the form shown in FIG. 26, an integral axial projection is provided on the base wall 12d of the cylinder 10d for threading the cylinder so that the base of the cylinder engages a complementary surface.

It can thus be seen that there has been provided a small gas cylinder which is relatively low in cost and be used either in die systems that are provided in connection with a manifold or valve blocks for supplying gas to a plurality of cylinders or in the form of a self-contained gas cylinder or spring; a small gas spring which is interchangeable with a coil spring; which can be readily substituted for a coil spring without any change in the tooling; which is compact and effective for the intended purpose; which obviates the deleterious effects of oil or other contaminants from the exterior of the press or die; which can be readily assembled; which will be retained in position in case of dissipation or loss of gas pressure without risk of damage to the tooling; which does not require any separate casing as is used in coil springs; and which can be provided in various sizes to produce the desired forces so that the gas spring can replace a plurality of coil springs.

I claim:

1. A gas cylinder for use in a die system comprising
   a one-piece cylindrical body having a base wall and a peripheral wall,
   a rod having a lower end and an upper end with a portion extending upwardly into the cylindrical body and moves within said body such that the body completely encircles and encloses the upper end of the rod,
   said rod having a flat base on the lower end thereof for engaging a flat surface on said die system,
   said base having an outer diameter greater than the diameter of the portion of the rod that moves within the body,
   said cylindrical body and said rod including interengaging means limiting axial outward movement of the cylindrical body relative to the rod,
   fastener means on said base for connecting said flat base of said rod to a flat surface to said die system,
   said rod being hollow,
   charging valve means on said base of said rod and relief valve means on the base wall of said cylindrical body,
   said fastener means comprising axial openings in said portion of said base of said rod for receiving fasteners extending through said openings into said die system.

* * * * *